United States Patent [19]
Bott

[11] 3,719,246
[45] March 6, 1973

[54] DEVICE IN VEHICLES, PARTICULARLY AUTOMOTIVE VEHICLES, FOR SKID PREVENTION

[75] Inventor: Helmuth Bott, 7254 Munchingen, Germany

[73] Assignee: Firma Dr. -Ing. h. c. F. Porsche K.G., Stuttgart-Zuffenhausen, Germany

[22] Filed: Dec. 16, 1969

[21] Appl. No.: 885,438

[52] U.S. Cl. ............. 180/103, 123/102, 180/79.1, 180/109, 244/111, 303/21 A, 303/21 P, 303/21 BE
[51] Int. Cl. .......................... B60t 8/18, B60t 8/24
[58] Field of Search................. 180/103, 104, 82, 76; 303/21 R, 21 P, 21 CG, 21 BE, 21 A, 21 AF, 21 H, 21 B, 21 FD; 244/111; 123/102, 198

[56] References Cited

UNITED STATES PATENTS

| 3,401,985 | 9/1968 | Williams et al. | 303/21 BE |
|---|---|---|---|
| 3,362,757 | 1/1968 | Marcheron | 303/21 A |
| 3,499,689 | 3/1970 | Carp et al. | 303/21 A |
| 3,525,553 | 8/1970 | Carp et al. | 303/21 P |
| 2,444,927 | 7/1948 | Gallagher | 303/21 A UX |
| 3,482,887 | 12/1969 | Sheppard | 303/3 X |
| 2,667,228 | 1/1954 | Wood et al. | 303/21 A |
| 3,260,555 | 7/1966 | Packer | 303/21 BB |
| 3,245,727 | 4/1966 | Anderson et al. | 303/21 EB |
| 3,503,654 | 3/1970 | Stamm | 303/21 EB |
| 3,159,729 | 12/1964 | Stelzer et al. | 303/21 A |
| 3,455,411 | 7/1969 | Carp et al. | 123/102 X |
| 2,537,444 | 1/1951 | Click | 192/3 R |
| 2,957,535 | 10/1960 | Helgeson | 180/79.2 |
| 3,497,233 | 2/1970 | Bolaski, Jr. | 280/112 R X |
| 3,285,623 | 11/1966 | Van Winsen | 280/112 R |

Primary Examiner—Leo Friaglia
Assistant Examiner—John P. Silverstrim
Attorney—Craig, Antonelli, Stewart & Hill

[57] ABSTRACT

A device for automotive vehicles including an antiblocking mechanism and means for skid prevention. The device essentially includes measuring instruments which detect the instantaneous driving condition and which are coupled with a control mechanism responsive to specific critical values of the vehicle. This control mechanism triggers actuatable means for the automatic control of at least one device serving to keep the vehicle on course upon reaching a predetermined critical value of lateral acceleration.

20 Claims, 2 Drawing Figures

PATENTED MAR 6 1973                    3,719,246

Inventor:
HELMUTH BOTT

BY Craig, Antonelli, Stewart & Hill
Attorneys

DEVICE IN VEHICLES, PARTICULARLY AUTOMOTIVE VEHICLES, FOR SKID PREVENTION

BACKGROUND OF THE INVENTION

The present invention relates to a skid prevention device in vehicles, and more particularly, to a device in automotive vehicles with an antiblocking mechanism for the vehicle wheels and means for skid prevention. It is the purpose of the present invention to increase the driving safety of vehicles by the avoidance of unstable driving conditions resulting in skidding of the vehicle, as is produced, in particular, due to the effects of a shock incurred by untrained drivers.

In general, the veering of the vehicle from its intended course is caused by an interfering force which is directed at right angles to the driving direction and which effects an angular movement about the vertical axis of the vehicle. Such an angular movement is forced on a vehicle when the effective interfering force generates a larger momentum about the vertical axis of the vehicle than the sum of the tracking or traction forces of all tires. In this connection, the lateral guide force is to be considered, in part, as a reactive force or torque of the pneumatic tire made up of wheel load and angle of yaw, which force is transmitted to the vehicle. For the other part, this lateral guide force is dependent on the wheel load and the camber angle.

In one known conventional device, the lateral or transverse stabilization of the vehicle is to be attained by controlling means for correcting the position of the vehicle provided at the wheel suspension by an instrument responsive to the movements of the vehicle about its longitudinal axis, in such a manner that the means maintain the vehicle in an upright position. This device, however, cannot give any satisfactory result, since it is impossible to draw a conclusion regarding the tracking or traction forces producible by the tires solely from the roll inclination of the sprung masses. In the conventional device, it is only possible to influence the roll inclination of the sprung masses. It is impossible to increase the lateral guide force. This unsatisfactory result cannot be improved, either, by the additionally suggested increase in measuring accuracy or by providing that the extent of positional correction is dependent on the maximum steering angle.

For improving the driving safety of vehicles, another conventional device is known for the prevention of blocking of one or more wheels during braking. The advantage of this device resides in the fact that the driver is able to reduce the velocity of the vehicle even in curves and in critical driving conditions without producing asymmetrical driving characteristics which result in vehicle skidding. The above-mentioned devices, by themselves, are not yet suitable for increasing the driving safety of automotive vehicles to a sufficient extent.

SUMMARY OF THE INVENTION

It is the aim of the present invention to solve the underlying problems of providing a device for preventing the skidding of vehicles, especially automotive vehicles, which, prior to reaching an unstable driving condition, automatically actuates one or more mechanisms for maintaining the track of the vehicle in the proximity of the stability limit independently of the reaction of the driver and solely dependent on the actual driving condition.

The underlying problems are solved in accordance with the present invention essentially by providing measuring instruments which detect the instantaneous driving condition and which are coupled with a control mechanism responsive to specific critical or threshold values of the vehicle. This control mechanism triggers actuatable means for the automatic control of at least one device serving for keeping the vehicle on course upon reaching a predetermined critical value of the transverse or lateral acceleration.

In accordance with a preferred embodiment of the present invention, the actual driving condition is determined by instruments for measuring the angular movement or position of the sprung mass about its axes of inertia, the transverse acceleration or transverse velocity of the wheels, as well as optionally the driving speed, and fed, in the form of electrical pulses, to the automatic control mechanism. In addition to the determination of the criteria immediately responsible for the actual driving condition, it is further necessary to determine the position of the power control member of the internal combustion engine.

The angular motions or positions of the sprung mass are detected by one or more instruments with respect to the rolling, yaw, and pitching axes. For this purpose, it is advantageous to provide a gyroscope exhibiting three axes of freedom in the over-all center of gravity of the vehicle. Transverse acceleration or transverse velocity are suitably detected by sensors disposed in the wheel axes or axles, whereas a sensor provided at the steering wheel detects the direction of the wheels. The position of the control member and the driving speed are advantageously measured, in the manner already employed in automatic change-speed transmissions, directly by means including potentiometers, capacitive or inductive elements. The gyroscope, as well as the sensors, are each associated with means, potentiometers or capacitive or inductive elements, for converting the measuring values into electric pulses.

The measuring values, which are indicated by the measuring instruments and converted into electric pulses, are fed to an automatic control mechanism constructed as an analog computer. In the automatic control mechanism, at least one invariable characteristic value providing information regarding the driving directional stability of the vehicle, and a program serving for maintaining the vehicle on course are fixedly pre-programmed. The automatic control mechanism, in turn, generates electric pulses, in dependence on the detected driving condition, serving for the actuation and deactivation of the control means for the devices keeping the vehicle on course. By a corresponding selection of the fixedly programmed critical values, which latter can be determined for each particular vehicle, inter alia, empirically, an actuation of the control means is triggered at a pre-determined threshold value disposed in the proximity of the stability limit of the vehicles.

The course-maintaining means are suitably associated only with those operating magnitudes of the vehicle which exert an essential influence on the driving condition. One of the course-maintaining devices can consist of a braking unit with conventional means for the prevention of premature blocking of one or more wheels during braking, or it can comprise a device for controlling the position of the power control member of the internal combustion engine. Another course-maintaining device can serve for increasing the tracking powers of the tires and can consist, for example, of an arrangement for forcibly providing a specific negative camber of the wheel. Also, a device for decreasing the roll inclination of the sprung mass can serve for increasing the total tracking or traction power of the tires. In this connection, means for increasing the restoring moment of the springs associated with the individual wheels can serve as the course-maintaining means. Finally, the course-maintaining means can be an arrangement for influencing the floating angle of the tires, and finally an arrangement for absorbing the wheel slippage. The above enumeration of course-maintaining devices is exemplary and does not purport to be complete. Rather, it is possible to employ, within the scope of the invention, all conventional and suitable means for maintaining a vehicle in a stable driving condition.

In a vehicle provided with the device of the present invention, it is possible either to employ part of the above-mentioned course-maintaining devices, or all of them together. However, normally at least two of these devices should be provided. The course-maintaining devices can be controlled by the automatic control mechanism, depending on the driving condition, either individually or together, simultaneously or successively.

In order to take any different road conditions which may occur into account, several programs, and advantageously three programs, are provided in the automatic control mechanism, for various road conditions, such as, for example, dry zone, wet zone, and winter driving zone. The driver can select, by means of a switching button disposed on the dashboard, whether he or the automatic control mechanism will take over the task of keeping the vehicle on its course in limit or boundary regions. The provision is made that an instrument measuring the air temperature and humidity directly above the road is connected to the control mechanism, the measuring pulses of this instrument causing the automatic control mechanism to automatically select the suitable program. Finally, the present invention also provides that the operating units available to the driver for the brakes and the power control member of the engine are bridged by the control means as soon as at least one of the course-maintaining devices is being actuated or controlled.

The device of the present invention detects the respectively ambient driving condition by using measuring instruments to determine all factors essential for the driving directional stability of the vehicle, such as the wheel load distribution, transverse acceleration or transverse velocity, and slip of the wheels, as well as the angle of yaw about the vertical axis. The device of the present invention also uses an automatic control mechanism to process the above factors conjointly with the structurally inherent characteristics of the vehicle, particularly the intrinsic steering behavior, the maximally usable lateral friction coefficient, the optimum wheel load distribution, and the like. By the exact determination of the driving condition, which would never be possible for a driver, means can be employed which are best suitable for maintaining the vehicle in a stable driving condition. Furthermore, all driving errors possibly arising from a shock reaction are avoided, so that the vehicle remains in a stable driving condition.

BRIEF DESCRIPTION OF THE DRAWING

These and further features, advantages and objects will become more apparent from the following description when taken in conjunction with the accompanying drawing which shows, for purposes of illustration only, one embodiment in accordance with the present invention, and wherein.

DETAILED DESCRIPTION OF THE DRAWING

In the interest of putting the present invention into practice in as uncomplicated a manner as possible, various prerequisites appear desirable in connection with the vehicle. By an appropriate selection of axle construction and spring synchronization, the objective should be an intrinsic steering characteristic which is neutral to under-steering to a minor extent. An approximately uniform weight distribution to the front and the rear axle, in conjunction with a small spacing of the roll axis from the over-all center of gravity, result in a further improvement of the inherent stability of the vehicle. Finally, the steering should be designed so that the steering angle is associated with the radius of the curve, no matter at what speed the curve is traversed.

Figure 1:
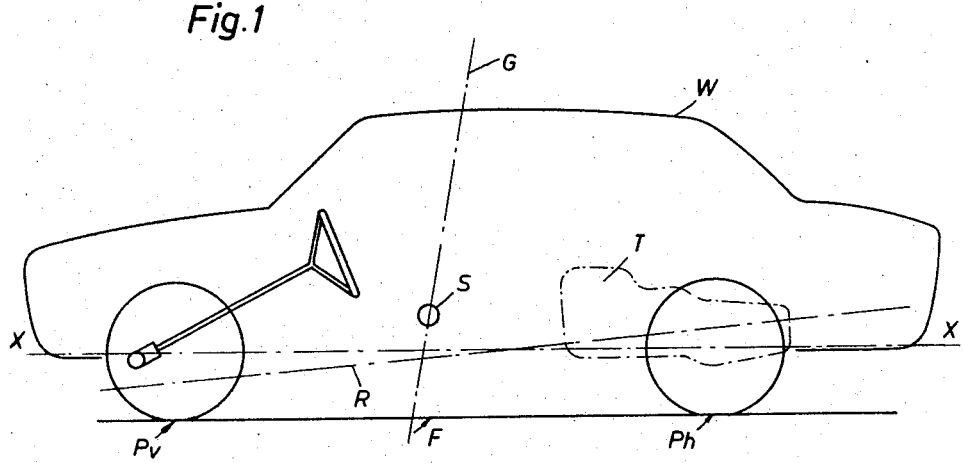
FIG. 1 is a schematic representation of an automotive vehicle with an engine block and the forces chiefly to be considered during the driving through a normal curve.

Referring now to the drawings and, in particular, to FIG. 1, such a vehicle is illustrated schematically. In this connection, the front wheels are guided on wheel forks and sprung independently of each other. The wheel forks are arranged so that the instantaneous center of the front axle is disposed between the axis of rotation of the wheels and the road. The rear axle is designed as a jointed cross-shaft axle with an instantaneous center disposed above the wheel center. Thereby, the roll axis R ascends from the front toward the rear. By a suitable arrangement and design of the car body W as well as of the engine T, together with all devices, a uniform distribution of the weight over the front and rear axles and a small spacing of the over-all center of gravity S from the roll axis R are attained.

The front wheels are placed at a steering angle in order to initiate the intended driving through a curve. The floating angle of the front wheels is first increased to a certain extend by the steering angle. The thus-resulting increase in the lateral component force of the front wheels effects a displacement of the lateral force pressure center in front of the over-all center of gravity S, so that a moment about the vertical axis G of the vehicle is produced effecting the entrance of the vehicle into the curve. Even at the smallest steering angle, the rear wheels have likewise imparted thereto a transverse velocity, whereby the rear wheels build up a lateral guide force, by means of which the angular velocity of the vehicle about the vertical axis G is attenuated, and the lateral force pressure center is displaced toward the rear by a corresponding amount. At the same time, in dependence on the vehicle speed, a centrifugal force F is produced, one component of which is effective in the over-all center of gravity S at right angles to the longitudinal central axis X—X of the vehicle. In case of driving through a constant curve with the predetermined steering angle and at unchanged driving speed, an equilibrium is obtained between the centrifugal force F directed at right angles to the longitudinal central axis X—X of the vehicle and the lateral guide forces P$v$ and P$h$ of the tires of the front and rear wheels.

Leaving all the factors out of consideration which lead only to insignificant changes of the lateral guide forces P$v$ and P$h$ of the wheels, the entire lateral guide force of the tires results from the wheel load, the floating angle, and optionally the wheel camber angle. The load on the individual wheels changes during the drive through the curve by the angular movement executed by the sprung masses under the influence of the centrifugal force F about the roll axis R. Thereby, the wheels on the inner side of the curve are relieved and the wheels on the outer side of the curve are stressed by the same amount.

Figure 2:
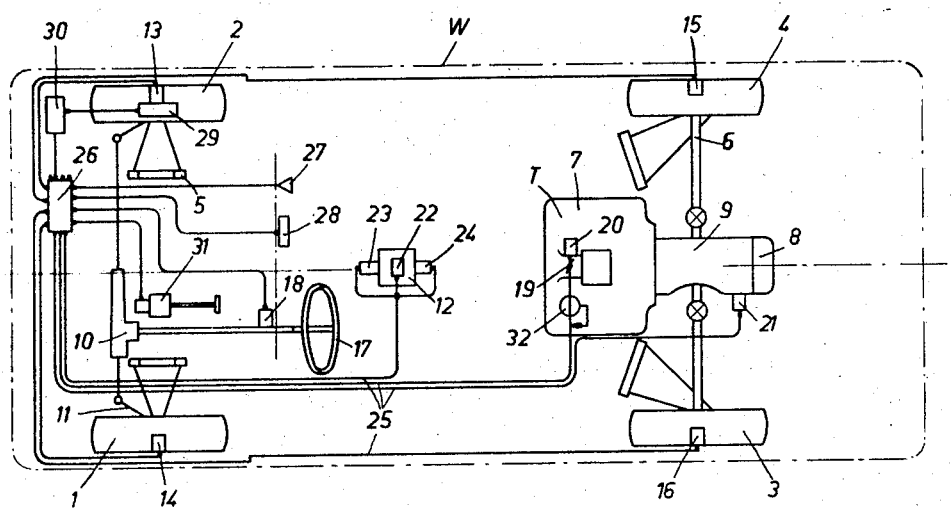
FIG. 2 is a schematic representation of the vehicle according to FIG. 1, equipped with the device of the present invention.

The condition of equilibrium obtained between the interfering force, here centrifugal force F, and the track-maintaining force of the tires, automatically within the stable range, can be maintained as long as an increase of the floating angle still results in an increase of the lateral guide forces P$v$ and P$h$. After surpassing this limit, the vehicle is in the unstable range dependent on the usable static friction coefficient of the tires. In order to ensure that the vehicle is kept on course in the stable range, means are provided which maintain the state of equilibrium upon the occurrence of interfering forces. These means are indicated in FIG. 2 in connection with a chassis for an automotive vehicle according to FIG. 1.

The vehicle with the car body W and the engine T is provided with a chassis having independently suspended front wheels 1 and 2 and, likewise, independently suspended rear wheels 3 and 4. The front wheels 1, 2 are guided on wheel forks 5. The rear wheels are associated with a jointed cross-shaft axle 6. The engine T consists of an internal combustion engine 7 and a fully automatic change-speed transmission 8, including a differential gear 9, combined in a block. For the steering angle of the front wheels 1, 2, a rack steering unit 10 is provided which engages, via steering knuckles 11, the king pins (not shown) of the front wheels. A gyroscope 12, which is disposed in the overall center of gravity S, is provided for detecting the wheel load distribution and responds to the angular movements of the sprung mass about the roll axis R. The gyroscope 12 has three axes or degrees of freedom and serves simultaneously for detecting the angular acceleration or angular velocity about the vertical axis G.

The transverse acceleration or transverse velocity of the tires is measured by means of sensors 13, 14, 15 and 16, disposed in the axles of the wheels 1, 2, 3, 4 whereas the position or direction of the front wheels is determined by a sensor 18 disposed at the steering wheel 17. The driving speed and the position of the power control member 19 of the internal combustion engine 7 are detected by means including potentiometers 20, 21. The gyroscope 12 has respectively one potentiometer 22, 23, and 24, for each axis or degree of freedom, which potentiometer assists in converting the measuring values into electric pulses. The sensors 13, 14, 15, 16, 18 contain conventional capacitive elements (not illustrated) for converting the measuring values into electric pulses. By means of the various lines 25, the measuring values of the individual sensors, converted into electric pulses, are fed to an automatic control mechanism 26, which is constructed as an electronic analog computer and which effects the countermeasures required for controlling the driving condition by comparing the measuring values with a fixed program.

In the automatic control mechanism 26, three programs, which deviate from one another, are stored for varying road conditions, such as, for example, dry zone, wet zone, or winter driving operation. The driver can operate the automatic control mechanism 26 by means of a switching knob or push button 27, an indicator instrument 28 is provided on the dashboard to indicate to the driver whether the mechanism 26 is switched on or off with respect to the particular program taking place. The pulses produced by the automatic control mechanism 26 in dependence on the road condition and on the measures required for the correction thereof are fed to actuatable control means, such as servo-motors and the like, which, in turn, control the course-maintaining devices.

The indicated course-maintaining devices consist, first of all, of a hydraulic braking unit provided with a conventional antiblocking device, and a mechanism for regulating the position of the power control member 19 of the internal combustion engine 7. In the braking unit, inductive pickup means 29 are associated in each case with the individual wheels, as illustrated for the front wheel 2, for monitoring the number of revolutions. The thus-determined measuring values are fed to a control mechanism 30. By means of control mechanism 30, the brake pressure of all four wheels is regulated in such a manner that, when the number of revolutions of one wheel drops prematurely, the brake pressure supplied to this wheel is reduced until it attains the same number of revolutions as the other wheels. For example, during cornering, the sensor 18 takes into account the fact that the wheels on the inside of the curve path must exhibit a lower velocity than the wheels on the outside of the curved path. The brake unit is actuated by a servomotor 31 connected to the automatic control mechanism 26. The throttle valve 19 of the internal combustion engine can be operated, in addition to its usual actuation, also by way of a servomotor 32 designed as an electric follow-up motor.

Additional means for course maintenance above and beyond the scope indicated in the foregoing include measures for varying the wheel position such as camber, caster, and the like, spring hardening, spring balancing between the front and rear axles, etc. All of these means are synchronized so that the above-described course-maintaining mechanism becomes already effective below the limit of the transverse acceleration maximally permissible for the respectively provided vehicle design, so that the vehicle cannot enter an unstable driving condition. If, in the illustrated vehicle design, a maximally possible transverse acceleration of 0.8 g. is detected, then the program for the control mechanism is set to about 0.75 g. This means that the brakes are actuated and the power control member of the engine is reduced to a lower driving power, independently of the driver's reaction, already below the critical threshold value, i.e., before the driving condition changes to stalling. Consequently, the vehicle cannot enter a supercritical driving condition even when the driver incurs a shock reaction.

While I have shown and described only one embodiment in accordance with the present invention, it is to be clearly understood that the same is susceptible to numerous changes and modifications as will be apparent to one having ordinary skill in the art. The present invention encompasses all measures and devices suitable for influencing the driving condition, insofar as they can be detected and controlled by an automatic control mechanism. Further, the gyroscope with three axes of freedom described above can also be replaced by individual gyroscopes for the various axes of inertia of the vehicle. I, therefore, do not wish to be limited to the details shown and described herein, but intend to cover all such changes and modifications within the scope of the present invention.

I claim:

1. An anti-skid device for use in a vehicle, especially an automotive vehicle; said device comprising: measuring means for detecting a plurality of driving parameters associated with the instantaneous driving condition of the vehicle, wherein said driving parameters detected by the measuring means include: the transverse acceleration of the vehicle, and at least one of the position of a power control member of a vehicle internal combustion engine propelling the vehicle, and the angular movement of sprung masses of the vehicle with respect to the roll, pitch and yaw axes; said measuring means supplying measuring means output signals for each of the values of the driving parameters detected, course maintaining means for maintaining the vehicle on course, said course maintaining means including means for varying the vehicle wheel position relative to the surface over which the wheels are travelling, and control means responsive to the measuring means output signals for automatically actuating and controlling said course maintaining means, said control means being programmed with at least one control program corresponding to predetermined characteristics values and interrelationships of said driving parameters and with a program for actuating and controlling said course maintenance means as a function of measuring means output signals corresponding to differences in the values and interrelationships of said driving parameters from those of the control program.

2. Device according to claim 1, wherein the driving parameters detected by the measuring means include the angular movement of sprung masses of the vehicle with respect to the roll, pitch and yaw axes.

3. Device according to claim 1, wherein the driving parameters detected by the measuring means includes the position of a power control member of the vehicle internal combustion engine, said measuring means including a potentiometer means for detecting said position.

4. Device according to claim 3, wherein the driving parameters detected by the measuring means include the angular movement of the sprung masses of the vehicle with respect to the roll, pitch and yaw axes, and the vehicle driving speed.

5. Device according to claim 1, wherein said measuring means includes sensor means provided in the wheel axles for detecting said transverse acceleration or optionally transverse velocity of the vehicle wheels.

6. Device according to claim 1, wherein said measuring means further includes sensor means being provided at the vehicle steering wheel for detecting the directional orientation of the vehicle wheels.

7. Device according to claim 1, the driving parameters detected by the measuring means includes the angular movement of sprung masses of the vehicle with respect to the roll, pitch, and yaw axes, said measuring means including gyroscope means having three axes of freedom which is disposed in the over-all center of gravity of the vehicle for detecting said angular movement.

8. Device according to claim 7, wherein the gyroscope means are operatively associated with means for converting the measured values into electrical pulses.

9. Device according to claim 1, wherein several control programs for various road conditions are programmed in the control means, and wherein automatic switching means are provided whereby the several control programs can be selectively switched over to operate automatically in response to varying road conditions.

10. Device according to claim 9, wherein the driving parameters detected by the measuring means includes the angular movement of sprung masses of the vehicle with respect to the roll, pitch, and yaw axes, said measuring means including gyroscope means having three axes of freedom which is disposed in the over-all center of gravity of the vehicle for detecting said angular movement.

11. Device according to claim 9, further including means for measuring the air temperature and humidity directly above the surface of a road being operatively connected with the control means for automatically selecting the suitable program.

12. Device according to claim 11, wherein a switching knob is provided at the vehicle dashboard for selectively actuating and deactivating the control means.

13. Device according to claim 1, wherein a switching knob is provided at the vehicle dashboard for selectively actuating and deactivating the control means.

14. Device according to claim 13, wherein several control programs for various road conditions are programmed in the control means, and wherein automatic switching means are provided whereby the several control programs can be selectively switched over to operate automatically in response to varying road conditions.

15. Device according to claim 1, wherein said driving parameters detected include the directional orientation of the vehicle wheels associated with the steering of the vehicle, and wherein said measuring means includes a sensor means provided at the vehicle steering wheel for detecting said directional orientation of the vehicle wheels associated with the steering of the vehicle.

16. Device according to claim 1, wherein said course maintaining means includes an anit-blocking and anti-spin mechanism for the vehicle wheels.

17. Device according to claim 16, wherein said course maintaining means includes a mechanism for regulating the position of a power control member of the engine propelling the vehicle.

18. Device according to claim 1, wherein said measuring means output signals are electrical signals.

19. An anti-skid device for use in a vehicle, especially an automotive vehicle; said device comprising: measuring means for detecting a plurality of driving parameters associated with the instantaneous driving condition of the vehicle, wherein the driving parameters detected by the measuring means include the transverse acceleration of the vehicle, said measuring means supplying a measuring means output signal dependent on the values of the driving parameters detected, course maintaining means for maintaining the vehicle on course, said course maintaining means including means for varying the vehicle wheel position relative to the surface over which the wheels are travelling, and control means responsive to the measuring means output signal for automatically actuating and controlling said course maintenance means when the transverse acceleration of the vehicle reaches a predetermined value, wherein the driving parameters detected by the measuring means includes the angular movement of sprung masses of the vehicle with respect to the roll, pitch, and yaw axes.

20. Device according to claim 19, wherein said measuring means includes gyroscope means having three axes of freedom which is disposed in the over-all center of gravity of the vehicle for detecting said angular movement.

* * * * *